United States Patent
Juric

(10) Patent No.: US 8,103,268 B2
(45) Date of Patent: Jan. 24, 2012

(54) DEVICE AND METHOD FOR ASSESSING THE QUALITY OF A MOBILE PHONE OR MOBILE PHONE NETWORK

(75) Inventor: Pero Juric, Langendorf (CH)

(73) Assignee: Swissqual License AG (CH)

( * ) Notice: Subject to any disclaimer, the term of this patent is extended or adjusted under 35 U.S.C. 154(b) by 1004 days.

(21) Appl. No.: 11/916,533

(22) PCT Filed: Jun. 27, 2006

(86) PCT No.: PCT/CH2006/000345
§ 371 (c)(1),
(2), (4) Date: Feb. 25, 2008

(87) PCT Pub. No.: WO2007/000070
PCT Pub. Date: Jan. 4, 2007

(65) Prior Publication Data
US 2008/0207198 A1  Aug. 28, 2008

(30) Foreign Application Priority Data
Jun. 29, 2005  (EP) .................................. 05014049

(51) Int. Cl.
*H04W 24/00* (2009.01)
(52) U.S. Cl. ....................................... 455/425; 382/141
(58) Field of Classification Search .................. 455/425, 455/550.1; 356/237.1–240.1; 382/141–154
See application file for complete search history.

(56) References Cited

U.S. PATENT DOCUMENTS

| | | | | |
|---|---|---|---|---|
| 4,817,184 A * | 3/1989 | Thomason et al. | ............ | 382/141 |
| 5,175,772 A | 12/1992 | Kahn et al. | ......................... | 382/1 |
| 5,715,050 A * | 2/1998 | Haga | ............................ | 356/237.1 |
| 5,777,673 A | 7/1998 | Yoshikawa | ..................... | 348/337 |
| 5,805,667 A | 9/1998 | Alvarez et al. | ..................... | 379/1 |
| 5,994,916 A * | 11/1999 | Hayashi | ................... | 324/760.02 |
| 6,166,366 A * | 12/2000 | Lewis et al. | ................ | 250/208.1 |
| 6,313,442 B1 | 11/2001 | Richardson et al. | .......... | 219/400 |
| 2002/0157033 A1 | 10/2002 | Cox | ................................ | 714/1 |
| 2002/0160717 A1 | 10/2002 | Persson et al. | ............... | 455/67.1 |
| 2003/0036866 A1 * | 2/2003 | Nair et al. | ........................ | 702/81 |
| 2003/0063789 A1 * | 4/2003 | Kitabayashi | .................. | 382/141 |
| 2004/0012775 A1 * | 1/2004 | Kinney et al. | ............... | 356/237.2 |
| 2004/0213449 A1 * | 10/2004 | Safaee-Rad et al. | .......... | 382/141 |

FOREIGN PATENT DOCUMENTS
EP  0 634 875  1/1995
EP  1 377 080  1/2004

OTHER PUBLICATIONS

European Search Report dated Mar. 16, 2006.
John Watkinson, Spatial Oversampling: Why HD0 Broadcasting Makes Sense. Source: http://www.microsoft.com/whdc/archive/ovrsamp.mspx?pf=true#ovr4.
SPIE International Technical Group Newsletter, Jan. 2004, vol. 14, No. 1, pp. 1-12.
PCT International Search Report dated Aug. 24, 2006 issued in corresponding PCT International Appln. No. PCT/CH2006/000345 filed Jun. 27, 2006.

* cited by examiner

*Primary Examiner* — Steven Lim
(74) *Attorney, Agent, or Firm* — Ostrolenk Faber LLP

(57) ABSTRACT

The problem to be solved by the present invention is to provide a system that allows a realistic quality assessment of a mobile phone and/or mobile phone network. For this purpose, imaging optics are used to project the image from at least part of the phone display onto a camera. The image or video data from the camera is then processed in image processing circuitry for deriving at least one quality parameter for the received image or video.

21 Claims, 5 Drawing Sheets

DEVICE AND METHOD FOR ASSESSING THE QUALITY OF A MOBILE PHONE OR MOBILE PHONE NETWORK

CROSS-REFERENCE TO RELATED APPLICATION

The present application is a 35 U.S.C. §§371 national phase conversion of PCT/CH2006/000345, filed Jun. 27, 2006, which claims priority of European Patent Application No. 05014049.0, filed Jun. 29, 2005, the disclosure of which has been incorporated herein by reference. The PCT International Application was published in the English language.

TECHNICAL FIELD

The invention relates to a device as well as to a method for assessing the quality of a mobile phone and/or mobile phone network.

BACKGROUND ART o characterize the quality and performance of a mobile phone network, a mobile phone is conventionally placed in a suitable test device and brought into different locations within the network. At each location, the quality of communication is tested and logged. Similar test devices can also be used to test the quality of a mobile phone.

For testing the quality of the receipt of image or video data, conventional test systems access the raw digital data stream received by the phone, decode the same in an external computer and derive quality parameters from the decoded data.

DISCLOSURE OF THE INVENTION

The problem to be solved by the present invention is to provide a system that allows a more realistic quality assessment than conventional systems.

This problem is solved by the device and method according to the independent claims. Accordingly, imaging optics are used to project the image from at least part of the phone display onto a camera. The image or video data from the camera is then processed in an image processing computer for deriving at least one quality parameter for the received image or video.

Hence, in contrast to known systems, the present solution does not operate on the received digital raw data, but rather has the same processed by the phone's decoder and displayed by the phone's display. Hence, the analyzed video or image is the actually displayed video or image—since this is the video or image that the normal user of the phone will see, more realistic results are obtained. In particular, it has been found that the actually used algorithms for video quality assessment and the performance of the video or image decoder of the phone can substantially affect the image quality, hence an analysis of the received digital data provides only incomplete information. This is especially true for video data where very different quality characteristics are observed for differing video player software and hardware.

In addition, there is no need to run special grabbing software or other non-standard software or hardware on the phone, which allows to operate the phone under more realistic conditions.

Finally, it is easier to adapt the test device to a new phone because fewer adjustments are required.

In a particularly advantageous embodiment, the imaging optics comprises a mirror arranged under an angle to the display. This allows to align the camera with its axis in a direction that is not perpendicular to the display, giving more freedom of design. In particular, this allows a more compact design by "folding" the path of projection, which is of importance because the device should be portable.

Advantageously, the angle between the mirror and the display is approximately 45°, which allows to arrange the camera's axis parallel instead of perpendicular to the display, thereby allowing a particularly compact design. In addition and as described below, a device with this type of design can be used for phones with built-in displays as well as for phones with hinged displays.

Now, in order to implement these and still further objects of the invention, which will become more readily apparent as the description proceeds, the is manifested by the features that

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Figure 1:
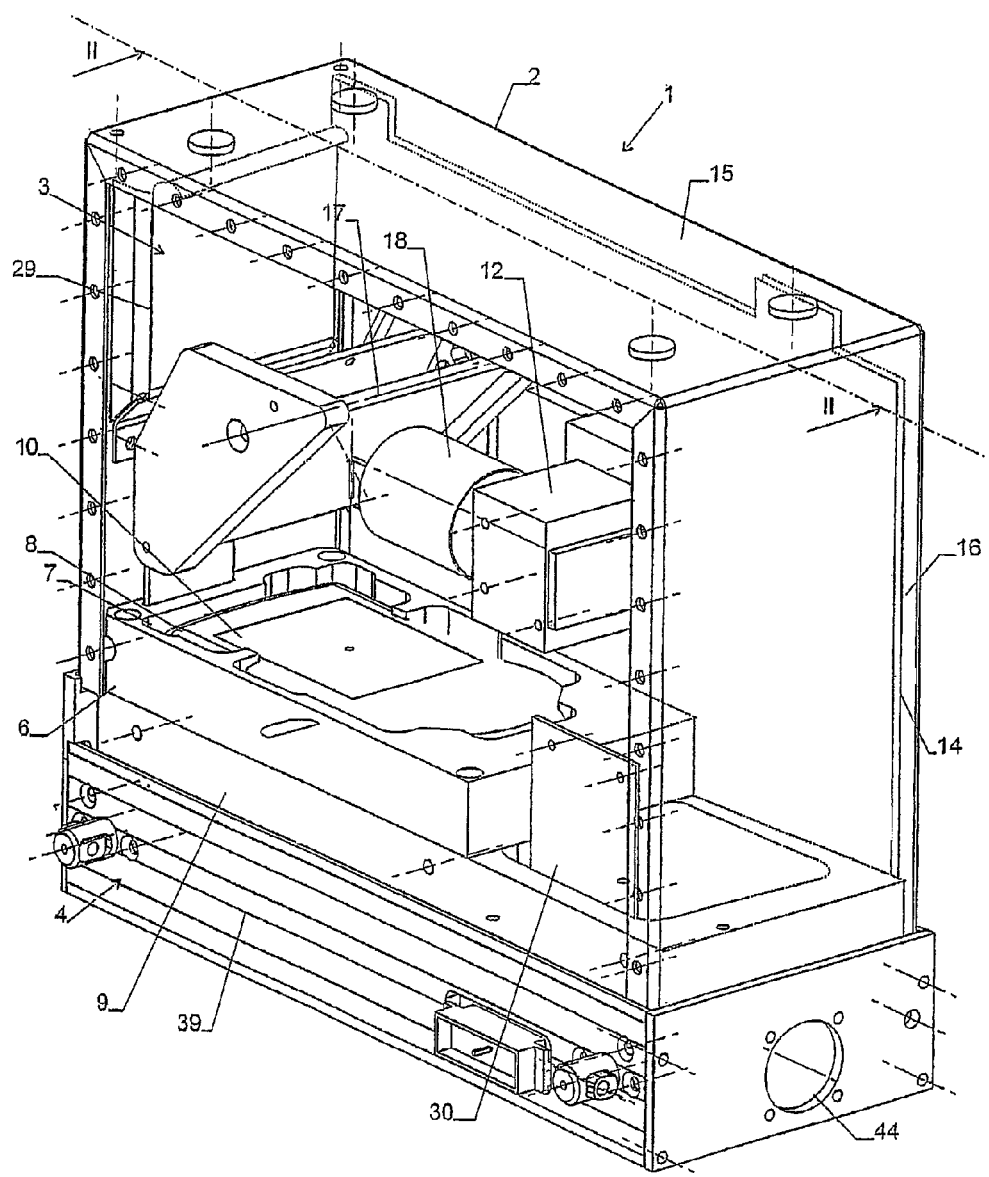
FIG. 1 is a three dimensional view of an embodiment of the device with one side wall removed.
Figure 2:
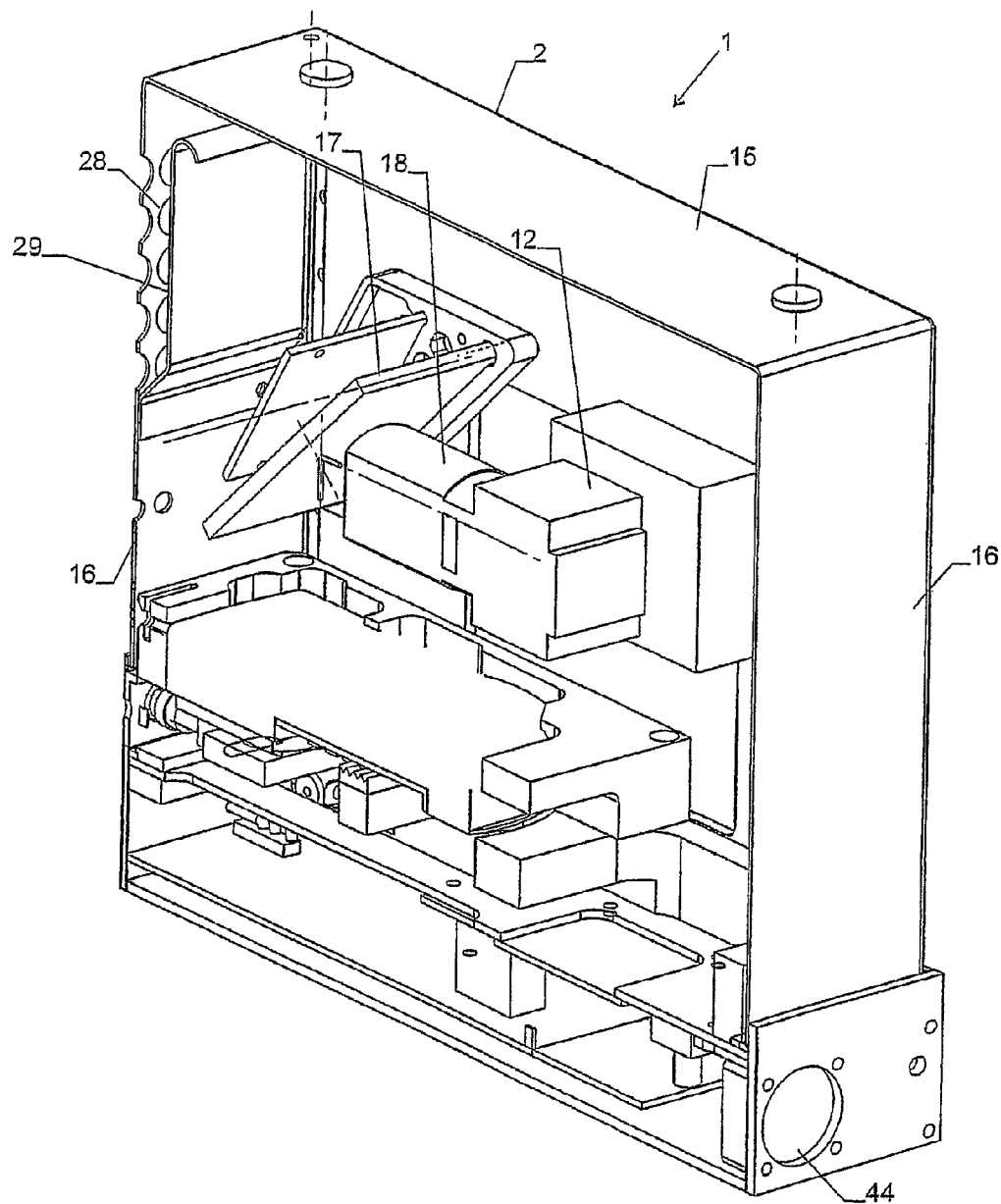
FIG. 2 is a three dimensional sectional view in a vertical plane along line II-II of FIG. 1.
Figure 3:
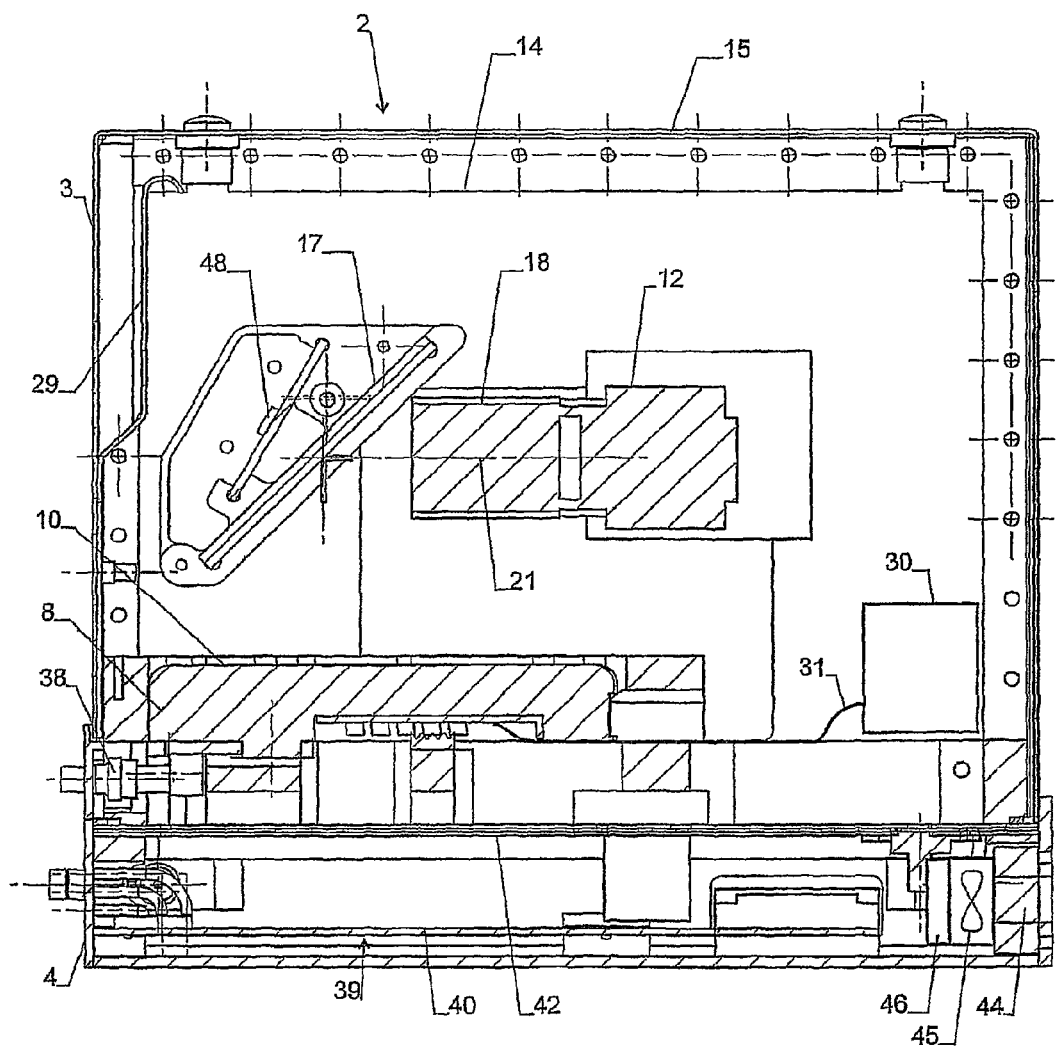
FIG. 3 is a two dimensional sectional view along line II-II of FIG. 1.

FIGS. 1-3 show a device 1 for testing mobile phones and their reception in a mobile phone network. The device comprises a housing 2 divided into an upper housing section 3 and a lower housing section 4.

A phone holder 6 is arranged in upper housing section 3. In the present embodiment, it is formed by a frame-like structure surrounding a central opening or recess 7 shaped to receive a phone 8 in a well defined position and orientation. Phone holder 6 is a modular part that can be replaced easily. Differently shaped phone holders 6 can be provided for different types and brands of phones. Phone holder 6 is mounted on a frame structure 9 in the bottom part of upper housing section 3.

The phone 8 shown in FIG. 1 is a device with an integrated display 10. It is placed in phone holder 6 in such a way that display 10 is facing upwards.

To monitor the quality of an image or video on display 10, a camera 12 is arranged in upper housing section 3. Camera 12 is mounted to a mount formed by two vertical plates 14 resting on frame structure 9, one of which is indicated in dashed lines in FIG. 1, with the other being parallel thereto arranged at the opposite side of the device. At their upper ends, the vertical plates 14 are connected to a top wall plate 15 of upper housing section 3, which in turn is connected to four vertical wall plates 16, thereby forming a rigid structure for keeping the relative position between camera 12 and display 10 fixed even when the device is exposed to movements, e.g. while it is being driven or walked through a mobile phone network.

Imaging optics comprising a mirror 17 and a camera objective 18 project the light from display 10 onto the photosensitive array of camera 12, which allows to view the image or video data displayed on display 10 by means of the camera.

As can best be seen in FIG. 3, mirror 17 is arranged under an angle of approximately 45°, such as between 30° and 60°, in respect to the surface of display 10. It reflects the light coming from display 10 into the direction of the axis 21 of camera 12. Camera axis 21 is substantially parallel to the surface of display 10 and to the longitudinal axis of mobile phone 8.

As mentioned above, mirror 17 folds the projection path of the imaging optics, thereby allowing to create a more compact device that takes less space and is mechanically more stable.

Figure 4:
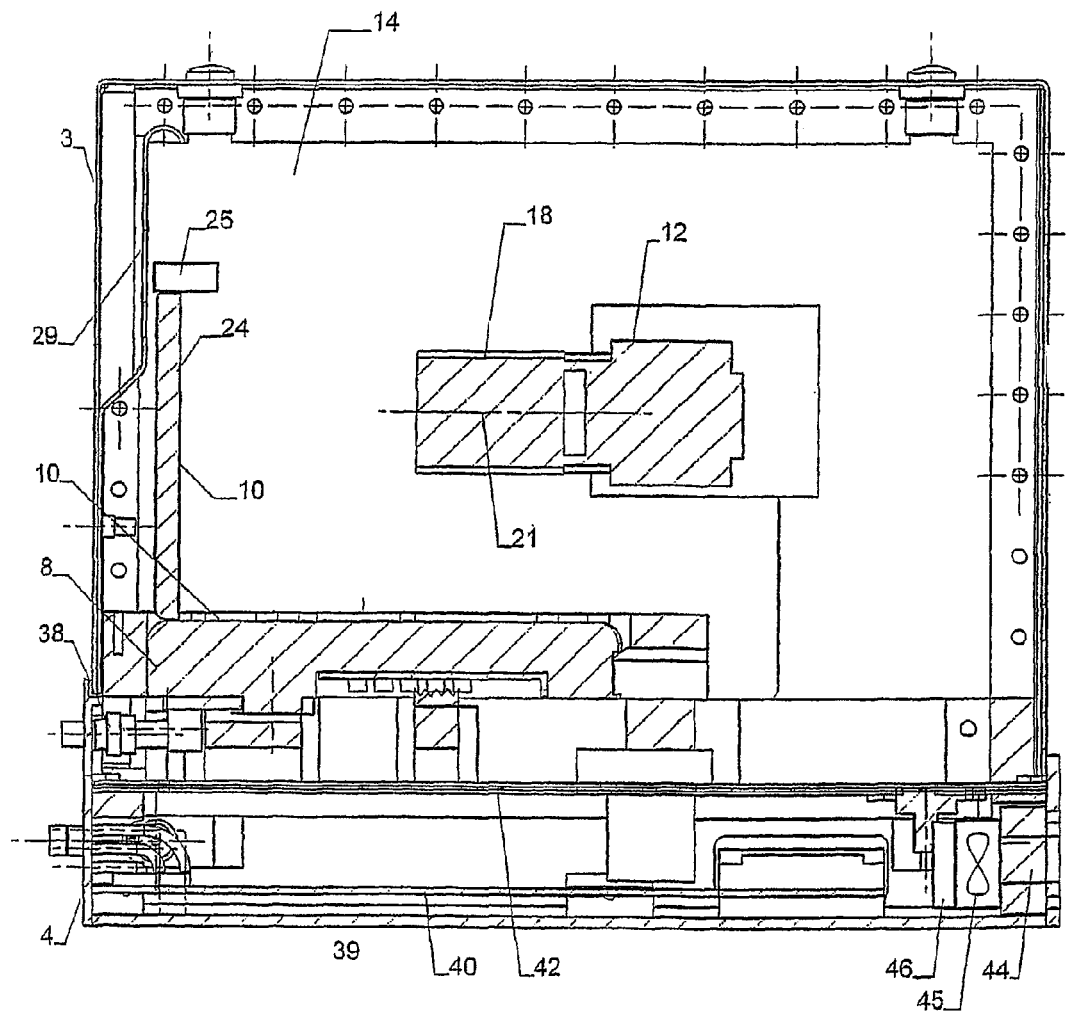
FIG. 4 is the device of FIG. 3 modified to receive a phone with hinged display.

A second advantage of using a design with folded projection path is the fact that, by removing mirror 17, it becomes possible to use the same basic design for testing a phone with hinged display, such as it is shown in FIG. 4. The device of FIG. 4 is being used for a phone the display 10 of which is in a separate display housing 24 pivotally attached to the body of phone 8. To allow camera 12 to view display 10 of the phone, display housing 24 is pivoted such that display 10 is substantially vertical and stands perpendicularly to camera axis 21. A retainer 25 e.g. mounted to vertical plate 14 is used to keep display housing 24 in its vertical position.

Turning now back to FIGS. 1-3, it can be seen that there is a number of objects arranged in upper housing section 3, all of which can potentially reflect the diffuse light coming from display 10. To avoid undesired noise from such reflected light in the signal of camera 12, all components within upper housing sections 3 with the exception of the imaging optics 17, 18 and the mobile phone 8 should have black, non-reflecting surfaces. This is in particular true for the walls 15, 16 and the vertical plates 14.

In addition, and as best can be seen in FIG. 2, upper housing section 3 has a number of ventilation openings 28 in one of the vertical walls 16. These ventilation openings carry off heat generated by the device 1 and the phone 8. To prevent light entering ventilation openings 28 from reaching camera 12, at least one light baffle plate 29 is arranged in front of the openings 28 for forming a labyrinth preventing light from entering upper housing section 3. Baffle plate 29 is non-transparent plastic or metal plate. To further improve the light retention properties of the labyrinth, several baffle plates can be arranged behind each other, forming a meandering path for passage of the ventilation air between them.

When using device 1, it may frequently be necessary to change some characteristics on the SIM card of phone 8, e.g. for switching between different network providers. To simplify this process, a SIM card holder 30 externally to phone 8 is arranged in upper housing section 3. A connector 31, as shown in FIG. 3, is provided to connect SIM card holder 30 to a dummy SIM card placed in the SIM card bay of phone 8, thereby connecting a SIM in SIM card holder 30 to phone 8. This makes it possible to replace the SIM card without removing phone 8 from phone holder 6.

Upper housing section 3, and in particular the walls 15, 16 as well as the vertical plates 14, can be made of a plastic or metal. If they are of a conductive material, they may hinder radiowave communication between phone 8 and a mobile phone network.

To ensure proper communication between phone 8 and the network, upper housing section 3 is therefore, in one embodiment, at least partially of plastics for allowing radiowave communication between phone 8 in holder 6 and the mobile phone network. In particular, the walls 15, 16 as well as the vertical plates 14 are, in that case, advantageously made from a sturdy plastic material.

Alternatively, and as shown in particular in FIG. 3, a lead-through 38 may be provided for connecting phone 8 in phone holder 6 to an external antenna.

The signals from camera 12 must be processed by suitable control and processing circuitry. This circuitry is preferably integrated, at least in part, in device 1.

In the embodiment of FIGS. 1-3, most parts of the control and processing circuitry 39 are located on a PCB in lower housing section 4. In an advantageous embodiment, the control and processing circuitry 39 forms an image processing computer for evaluating the quality of the image or video from camera 12 connected to it.

Control and processing circuitry 39 further comprises electronic components and software for controlling and monitoring the operation of phone 8. In particular, it is connected to a digital interface of the phone, which allows the circuitry to issue commands to the phone and to receive status information therefrom. It may also contain an interface to an audio output of phone 8.

To prevent RF noise generated by processing circuitry 39 from interfering with the operation of phone 8, an RF shielding 42 is arranged between the two housing sections 3, 4, separating phone holder 8 from processing circuitry 39. (In this context, "RF noise" designates any electromagnetic noise in a frequency range above 1 MHz and in particular in the frequency range of communication that mobile phone networks are using.)

RF shielding 42 can e.g. consist of a metallic net or punctured plate, which has openings for the passage of electric cables and ventilation air.

An air inlet opening 44 is arranged in lower housing section 4, connecting the same to the surroundings of device 1. A ventilator 45 and heater 46, as schematically indicated in FIG. 3, are arranged at air inlet opening 44 for drawing in air and, if necessary and as described below, for heating the same.

The air drawn in by ventilator 45 through heater 46, through lower housing section 4, where it carries off heat generated by control and processing circuitry 39, and then enters upper housing section 3, where it carries off heat generated by phone 8 and camera 21. It then passes the gap above light baffle plate 29 and exits through the outlet openings 28.

To control the operation of the heater 46, a temperature sensor 48 is arranged in upper housing section 3. The temperature from temperature sensor 48 is monitored by control and processing circuitry 39 and heater 46 is switched on if the temperature in upper housing section 3 is below a preferred operating temperature of phone 8, e.g. at 20° C. The advantage of this is two-fold: One the one hand, phone 8 and in particular its display 10 may fail if temperatures are too low. On the other hand, heating the incoming air reduces its relative humidity, thereby reducing the risk of water condensation on display 10 of phone 8, on imaging optics 17, 18, and/or on camera 12.

The algorithms to be used in control and processing circuitry 39 for analyzing the quality of the incoming image or video signal depend on if a "full reference", "reduced reference" or "no reference" analysis is to be carried out, i.e. if the original image or video (before it was transmitted over the network) is known fully, in part or not at all. Various such algorithms are known to the person skilled in the art and e.g. described in Z. Wang, A. C. Bovik, and B. L. Evans, "Blind measurement of blocking artifacts in images," in Proc. IEEE Int. Conf. Image Proc., vol. 3, September 2000, pp. 981-984, or in H. R. Sheikh, Z. Wang, L. K. Cormack, and A. C. Bovik, "Blind Quality Assessment for JPEG2000 Compressed Images", Thirty-Sixth Annual Asilomar Conference on Signals, Systems, and Computers, Pacific Grove, Calif., Nov. 3-6, 2002.

Figure 5:
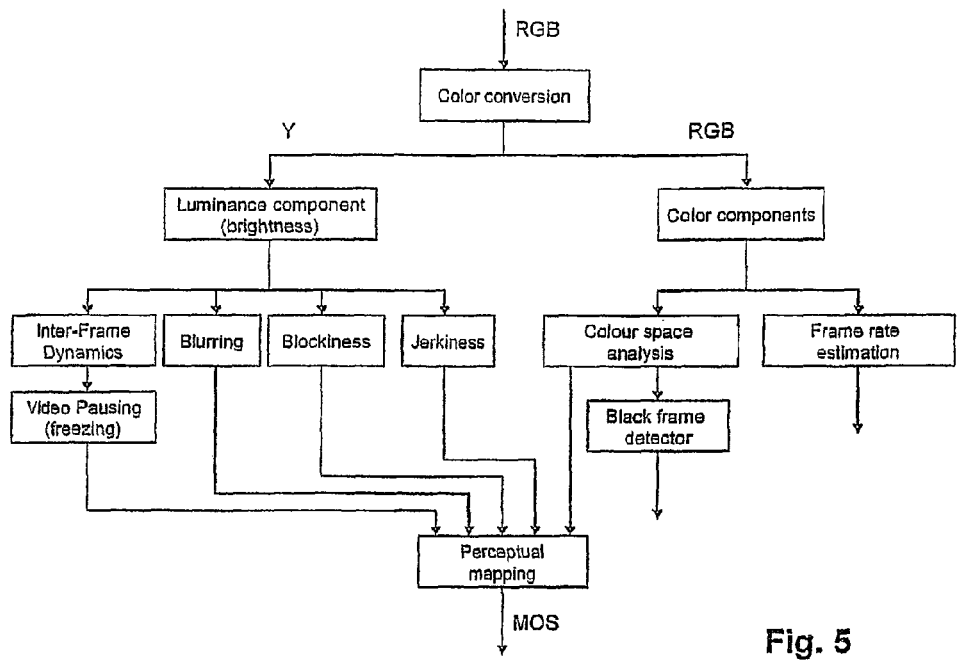
FIG. 5 is an algorithm for no-reference video quality assessment, FIG. 6 an alternative arrangement of the phone inside the device, and FIG. 7 a camera for being used in the device.

A specific example of an algorithm for a no-reference video quality assessment is shown in FIG. 5. It has the following processing steps:

The input video signal is color converted to obtain a luminance signal Y and an RGB signal.

The luminance Y and RGB signal are processed separately.

Using the luminance Y signal, blurring, blockiness, jerkiness and inter frame (picture) dynamics is are derived.

The color signal allows to determine a parameter describing the colorfulness and to detect black frames.

Perceptual mapping combines the results from the above analysis to a single quality number (MOS=Mean Opinion Score), which is a main result of the algorithm.

In order to avoid anti-aliasing problems, the resolution of camera 12 is advantageously sufficiently high such that each pixel of the projected part of display 10 is projected onto at least two horizontal and two vertical pixels of camera 12. This oversampling prevents data loss between display 10 and the signal of camera 12. In addition to this, advantageously, care should be taken to avoid anti-aliasing and Moiré-effects as described below.

Similarly, data loss in time space can be avoided if the frame rate of the camera is at least equal to the frame rate of the display.

Depending on the section of display 10 that is projected onto camera 12, some parts of the recorded image may have to be filtered out before processing. For example, if the projected part of display 10 contains status information superimposing a video image, the areas containing the status information may have to be ignored.

Apart from assessing the quality of image or video data recorded by camera 12 from display 10, control and processing circuitry 39 may also derive information indicative of an operational status of phone 8 from the signal from camera 12. For example, if phone 8 displays a typical error message on display 10 in case of malfunction, this error message can be detected by suitably processing the image recorded by camera 12. Similarly, a malfunctioning camera may exhibit typical display behavior, such as a complete freeze or blackout of the display, which again can be detected by suitably processing the signal from camera 12. Generally, the signal from the camera 12 can be processed to detect an operational status and in particular a malfunctioning of the phone. Depending on the detected operational status, suitable commands can then be issued to the phone or the phone can be reset.

In the embodiment above, control and processing circuitry 39 is capable to fully process the signal from camera 12 and to create the relevant parameter's describing the quality of the image or video data. However, part of that functionality can also be delegated to an external computer.

In the embodiment of FIGS. 1-4, the phone is arranged horizontally, i.e. with its longitudinal axis 50 parallel to RF shielding 42. As mentioned above, this may lead to an undesired interaction between the phone's antenna and RF shielding 42 if the phone's built-in antenna is used.

To avoid this problem, the phone can be arranged differently within housing 2. It may e.g. be arranged horizontally adjacent to top wall plate 15, with its display 10 facing downward, or it may be arranged adjacent to one of the side wall plates 16, in which case at least the corresponding wall plate 15 or 16, respectively, should be made from a non-conducting material.

Figure 6:
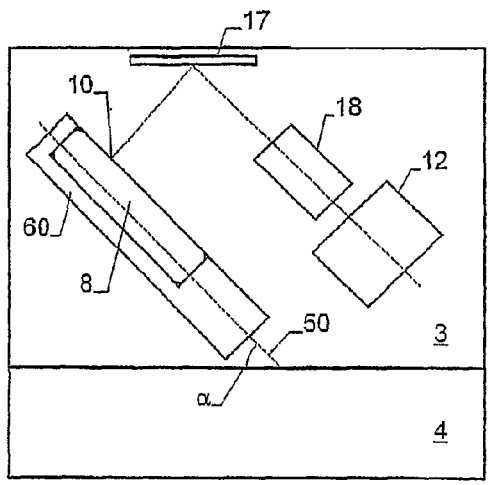

FIG. 6 shows a further possible embodiment where holder 6 is arranged to hold phone 8 with its longitudinal axis at an angle α of approximately 45° to RF shielding 42. The mirror 17, imaging optics 18 and camera 12 have been rotated by the same amount. Hence, in this embodiment the end section of the phone 8 carrying display 10 is further away from RF shielding 42 than the opposite end section. Since the phone's antenna is generally arranged in the end section of the display, this arrangement again reduces possible undesired interactions between the antenna and RF shielding 42.

As mentioned above, care should be taken to avoid anti-aliasing effects and Moiré-effects. This type of effects are observed when viewing a rasterized image, such as display 10, through a digital camera.

Figure 7:
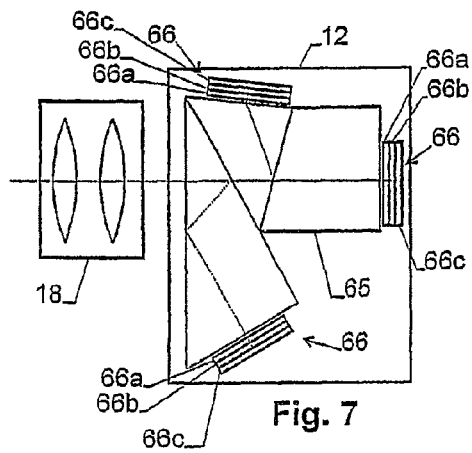

FIG. 7 shows an advantageous design of the camera 12 that avoids such effects. It comprises a prism assembly 65 that acts as a beam splitter and splits the light from imaging optics 18 into three substantially equal parts. Each part is projected onto a receiver 66, with all receivers being substantially at the same optical path length from imaging optics 18. Each receiver 66 comprises a color filter 66a, a spatial low pass filter 66b and a CCD array 66c.

The color filters 66a differ for the three receivers 66, such that the receivers separately record the red, green and blue spectral components of the light, respectively.

Each spatial low pass filter 66b carries out a local averaging operation of the light such that each camera pixel of the CCD arrays 66c receives light locally averaged over at least a pixel distance of the camera. In other words, the spatial low pass filters filter any spatial light components having a frequency exceeding the spatial Nyquist frequency of the camera 66c.

Each spatial low pass filter 66b may e.g. consist of several superimposed birefringent plates where each plate separates the incoming light pattern into two mutually offset patterns of different polarization. Devices of this type are known to the person skilled in the art. The number and thickness of the plates can be adapted to the pixel spacing of the sensor.

Instead of using three separate spatial low pass filters 66b, a single low pass filter can be arranged before prism assembly 65, or it can be integrated in the imaging optics 18.

The use of one or more CCD arrays is preferred over CMOS cameras because all pixels in a CCD array can be triggered simultaneously to record light during the same time window, while the pixels of CMOS cameras can only be triggered sequentially in row-by-row fashion. A global triggering is advantageous because the contents of display 10 of phone 8 change from one frame to the next. Using a camera that has a global trigger for triggering all the camera pixels simultaneously to record light over the same period of time allows to take a snapshot of the whole display 10 with all display pixels showing the same frame with the same intensity.

Using three separate CCD arrays (or other camera chips) 66c for the three color components is also preferred over using a single CCD array with triple resolution and spatially resolved color filter in front of it. This is because a camera having a single CCD array a spatially resolved color filter tends to suffer from color anti-aliasing effects. In addition, the differently colored pixels of display 10 may reside in different layers at slightly different distances from imaging optics 18, which makes it impossible to focus all colors at the same time if a camera with a single CCD array is used.

While there are shown and described presently preferred embodiments of the invention, it is to be distinctly understood that the invention is not limited thereto but may be otherwise variously embodied and practiced within the scope of the following claims.

The invention claimed is:

1. A device for assessing the quality of a mobile phone and/or mobile phone network comprising a phone holder for receiving a mobile phone having a display, said device comprising:
    a camera,
    imaging optics projecting at least part of the display of said mobile phone in said phone holder onto said camera,
    image processing circuitry connected to said camera,
    a housing enclosing said camera, said phone holder and said imaging optics, and
    said housing is of metal and said device comprises a lead-through for connecting the mobile phone in said phone holder to an external antenna.

2. The device of claim 1, wherein said imaging optics comprise a mirror under an angle to said display and reflecting light from said display into a direction along an axis of said camera.

3. The device of claim 2, wherein said angle is approximately 45° and wherein said axis is approximately parallel to said display.

4. The device of claim 1, wherein said housing comprises at least one ventilation opening and at least one light baffle plate arranged in front of said opening for forming a labyrinth preventing light from entering said housing.

5. The device of claim 1, wherein said housing is at least partially of plastics for allowing radiowave communication of the mobile phone in said phone holder with the mobile phone network.

6. The device of claim 1, wherein each pixel of the projected part of said display is projected onto at least two horizontal and two vertical pixels of said camera for achieving spatial oversampling.

7. The device of claim 1, wherein a frame rate of said camera is at least equal to a frame rate of said display.

8. The device of claim 1, wherein said image processing circuitry and said phone holder are arranged in different parts of a common frame or housing with a RF shielding arranged between them.

9. The device of claim 8, wherein said holder is arranged to hold a longitudinal axis of said phone under a non-zero angle, in particular under approximately 45°, in respect to said RF shielding.

10. The device of claim 1, further comprising a heater for heating air passing over said imaging optics and/or camera and/or phone holder.

11. The device of claim 10, further comprising a temperature sensor for monitoring a temperature of said phone and/or imaging optics and controlling an operation of said heater.

12. The device of claim 1, further comprising a SIM card holder and a connector to be inserted into a SIM card bay of said phone, said SIM card holder allowing to replace a SIM card to be used by said mobile phone while said mobile phone is in said phone holder.

13. The device of claim 1, wherein said phone holder comprises a recess or opening for receiving said phone in a predefined position.

14. The device of claim 1, wherein said camera has a plurality of camera pixels separated by a pixel distance, and wherein said camera or said imaging optics comprises a low pass filter such that each camera pixel receives light is locally averaged over at least one pixel distance.

15. The device of claim 1, wherein said camera comprises three separate camera chips, each of said chips recording the pixels for one color component.

16. The device of claim 1, wherein said camera has a global trigger for triggering all camera pixels to record light over the same period of time, and in particular wherein said camera comprises a CCD array.

17. A method for assessing the quality of a mobile phone and/or mobile phone network characterized by the steps of
    receiving, by means of a mobile phone, image or video data,
    displaying said image or video data on a display of said phone,
    imaging at least part of display onto a camera;
    processing a signal from said camera; and
    preventing a condensation on imaging optics and/or said display and/or said camera by heating air passing over said imaging optics and/or display and/or camera.

18. The method of claim 17, wherein each pixel of the projected part of said display is projected onto at least two pixels of said camera for achieving spatial oversampling.

19. The method of claim 17, wherein a frame rate of said camera exceeds a frame rate of said display.

20. The method of claim 17, wherein said data is video data.

21. The method of claim 17, comprising the step of deriving information indicative of an operational status of said phone and in particular a malfunctioning of said phone.

* * * * *